(12) United States Patent
Lo et al.

(10) Patent No.: US 6,785,236 B1
(45) Date of Patent: Aug. 31, 2004

(54) PACKET TRANSMISSION SCHEDULING WITH THRESHOLD BASED BACKPRESSURE MECHANISM

(75) Inventors: W. Steven Lo, Aberdeen, NJ (US); Sunder R. Rathnavelu, Marlboro, NJ (US)

(73) Assignee: Lucent Technologies Inc., Murray Hill, DE (US)

( * ) Notice: Subject to any disclaimer, the term of this patent is extended or adjusted under 35 U.S.C. 154(b) by 0 days.

(21) Appl. No.: 09/580,786

(22) Filed: May 28, 2000

(51) Int. Cl.[7] ............................................. H04L 12/26
(52) U.S. Cl. ..................... 370/235; 370/392; 370/412; 370/429
(58) Field of Search .......................... 370/230, 230.1, 370/231, 235, 236, 392, 395.21, 395.4, 395.41, 395.42, 395.71, 412, 413, 428, 429

(56) References Cited

U.S. PATENT DOCUMENTS

| | | | | |
|---|---|---|---|---|
| 5,872,769 A | * | 2/1999 | Caldara et al. | 370/230 |
| 5,982,776 A | * | 11/1999 | Manning et al. | 370/235 |
| 6,167,029 A | * | 12/2000 | Ramakrishnan | 370/235 |
| 6,405,258 B1 | * | 6/2002 | Erimli et al. | 370/235 |
| 6,611,522 B1 | * | 8/2003 | Zheng et al. | 370/395.21 |
| 6,614,756 B1 | * | 9/2003 | Morgenstern et al. | 370/230 |

OTHER PUBLICATIONS

Tsquare, TS704—672 Channel HDLC Controller Data Book (Mar. 1999).
D.C. Stephens, et al, Implementing Scheduling Algorithms in High–Speed Networks, IEEE JASC (Jun. 1999) at 1145–58.
S. Rathnavelu, Adaptive Time Slot: A Scheduling Scheme for ATM End Points, IEEE GlobeCom (1996) at 2118–22.
H.J. Chao, et al, Design of Packet–Fair Queuing Schedulers Using a RAM–Based Searching Engine, IEEE JSAC (Jun. 1999) at 1105–26.
N.F. Maxemchuk, et al, Measurement & Interpretation of Voice Traffic on the Internet ICC'97.
N.F. Maxemchuk, et al, A Cooperative Packet Recovery Protocol for Multicast Video, IEEE Int. Conf. on Network Protocols (Oct. 1997) at 259–61.
A. Demers, et al, Analysis & Simulation of a Fair Queueing Algorithm, Proc. of ACM SIGCOMM (1989) at 1–12.
S.J. Golestani, A Self–Clocked Fair Queueing Scheme for Broadband Applications, Proc. IEEE/INFOCOM 94, at 5c1.1–10.
M Shreedhar, et al, Efficient Fair Queuing Using Deficit Round Robin, IEEE/ACM Trans Networking (Jun. 1996) at 231–242.
D. Stiliadis, et al, Efficient Fair Queueing Algorithms for Packet–Switched Networks, IEEE/ACM Trans Networking (Apr. 1998) at 175–85.

* cited by examiner

*Primary Examiner*—Chi Pham
*Assistant Examiner*—Anh-Vu H Ly

(57) ABSTRACT

Streams of information are transmitted over corresponding channels of an information network, by associating a number of queues with the channels, enqueuing incoming descriptors representing information to be transmitted over a given channel in a queue associated with the channel, and dequeuing the descriptors from the queues by operation of a scheduler. A small and fixed-size buffer is associated with each channel, and a watermark threshold value corresponding to a minimum occupancy level is defined for each of the transmit buffers. When the occupancy of a given buffer falls below the buffer's threshold value, a corresponding watermark event signal identifying the channel associated with the buffer is produced. The watermark event signals are provided to the scheduler, and information represented by descriptors dequeued by the scheduler are delivered to corresponding buffers according to the order of the watermark event signals provided to the scheduler.

6 Claims, 3 Drawing Sheets

FIG. 2
| 31 | 13 12 | 0 |
|---|---|---|
| RESERVED | LCN | |
FIG. 3
PRIOR ART
FIG. 4
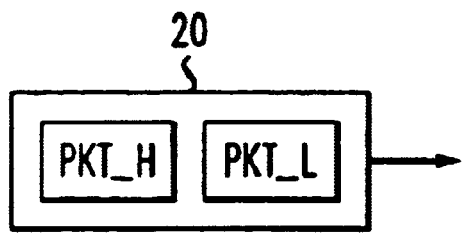

PROGRAMMABLE CONTROLLER 14

SCHEDULER 12

PACKET TRANSMISSION SCHEDULING WITH THRESHOLD BASED BACKPRESSURE MECHANISM

BACKGROUND OF THE INVENTION

1. Field of the Invention

This invention relates to a scheme for scheduling the transmission of streams of information over channels or links of an information network.

2. Discussion of the Known Art

Prior to transmission over links or logical channels of an information network, information streams corresponding, e.g., to voice, video, or data are typically stored in transmit buffers. It is not uncommon to transmit real time information such as voice and motion video together with non-time sensitive information (e.g., numerical data), serially over one logical channel or link between two nodes of a network.

For each network channel, descriptors representing information packets to be transmitted over the channel are received in a descriptor queue associated with the channel. There may be multiple internal queues within the descriptor queue for the channel, wherein the internal queues represent different classes of service carried by the same channel. When packet descriptors arrive, they are enqueued in their corresponding queues according to the desired transmission channel and class of service.

A transmit buffer is provided for each logical channel in the egress (i.e., transmission) direction. The buffers associated with the channels are served in a round robin fashion by operation of a scheduler, which acts to fetch and to forward a certain number of information packets to the buffers for transmission over the corresponding channels. That is, the buffers contain the actual information (e.g., IP packets) that will be transmitted over the channels of a system or network. To ensure a fair share of network resources over the channels, fair queuing and scheduling algorithms are typically used to allocate available bandwidth among all the logical channels. See, e.g., D. Stiliadis, et al., Efficient Fair Queuing Algorithms for Packet-Switched Networks, IEEE/ACM Trans. Networking, Vol. 6, No. 2 (April 1998); M. Shredhar, et al., Efficient Fair Queuing Using Deficit Round Robin, IEEE/ACM Trans. Networking (June 1996); S. Golestani, A Self-Clocked Fair Queuing Scheme for Broadband Applications, Proc. IEEE/INFOCOM 94; and A. Demers, et al., Analysis and Simulation of a Fair Queuing Algorithm, Proc. of ACM SIGCOMM (1989). All relevant portions of the cited publications are incorporated by reference.

The number of packet descriptors dequeued at one time for a given channel by the scheduler, is related to the bandwidth of the channel. Assume there are M logical channels in a given network, and that each channel requires a service time of $T_i$ within which to dequeue the appropriate amount of descriptors from its descriptor queue. After serving channel j, a time period of $$\sum_{i=0}^{M-1} T_i$$

must lapse before information is again served into the buffer for the same channel j.

Let an interval V between each visit to a given channel to load new information into the channel's buffer, be defined as $$V = \sum_{i=0}^{M-1} T_i$$

To achieve satisfactory quality of service (QoS) features for real-time traffic (e.g., voice communications), the time interval V should be relatively small (e.g., about 6 msec). This is important for real-time information packets which must be transported always within acceptable delay periods. See N. F. Maxemchuk, et al., A Cooperative Packet Recovery Protocol for Multicast Video, IEEE International Conference on Network Protocols (October 1997); and N. F. Maxemchuk, et al., Measurement and Interpretation of Voice Traffic on the Internet, ICC '97, all relevant portions of which are incorporated by reference. Thus, the interval V may become too long and unacceptable if most of the packets to be transmitted are large, and QoS will suffer.

At high speeds, the implementation of packet service disciplines is costly. The known schemes have the following problems. First, they are open-loop in the sense that they establish an acceptable time period V, and visit each channel at least once every time period V. At each visit to a channel, a number of descriptors related to the bandwidth of the channel are dequeued from the corresponding descriptor queue. This procedure requires the system hardware to be fast enough to finish all necessary tasks for each channel in a time period of V/M. Hardware complexity is a function of the number of active channels, and implementation becomes more challenging as the number of logical channels increases. There are schemes that try to provide efficient and scalable architecture in a cost-effective manner. See, e.g., H. J. Chao, et al, "Design of Packet Fair Queuing Schedulers Using a Ram-Based Searching Engine, IEEE JSAC, v. 17, no. 6 (June 1999); S. Rathnavelu, "Adaptive Time Slot; a Scheduling Scheme for ATM End-Points", IEEE Globe Comm 1996. See also U.S. Pat. No. 5,751,709 (May 12, 1998) and Pat. No. 5,712,851 (Jan. 27, 1998). A key difficulty with packet fair queuing (PFQ) algorithms is that they require buffering on a per-channel basis and non-trivial service arbitration among all channels. See D. C. Stephens, et al, "Implementing Scheduling Algorithms in High-speed Networks, IEEE JSAC v. 17, no. 6 (June 1999).

In general, two kinds of buffering schemes are known. In a fixed size buffering scheme, the use of buffers whose size is too small easily creates an underrun condition which results in channel starvation, and will cause overflow if packet sizes are large relative to the buffer's capacity. On the other hand, using large size buffers is costly if one wants only to accommodate a worst case condition, and large delays are introduced when implementing certain algorithms. In a variable size buffering scheme, dynamic storage allocation requires complicated management, and places further burdens on hardware design.

SUMMARY OF THE INVENTION

According to the invention, a method of transmitting streams of information over channels in an information network, includes associating a number of queues with corresponding channels of the network, enqueuing incoming descriptors representing information to be transmitted over a given channel in a queue associated with the channel, and dequeuing the descriptors from the queues by operation of a scheduler. A number of small and fixed size transmit buffers are associated with corresponding channels. A watermark threshold value corresponding to a minimum occupancy is defined for each of the transmit buffers. After the occupancy of a given transmit buffer falls below the threshold value for the buffer, a corresponding watermark event signal identifying the channel associated with the buffer is provided to the scheduler. Information represented by descriptors dequeued by the scheduler is delivered to the corresponding buffers, according to the order of the event signals provided to the scheduler.

For a better understanding of the invention, reference is made to the following description taken in conjunction with the accompanying drawing and the appended claims.

BRIEF DESCRIPTION OF THE DRAWING

In the drawing:

FIG. 2 is an example of a format for a watermark event signal produced in the arrangement of FIG. 1;

FIG. 3 illustrates high and low priority information packets loaded in a transmission buffer of prior packet scheduling systems;

FIG. 4 illustrates high and low priority packets loaded in a transmission buffer of the present scheduling arrangement.

DETAILED DESCRIPTION OF THE INVENTION

Figure 1:
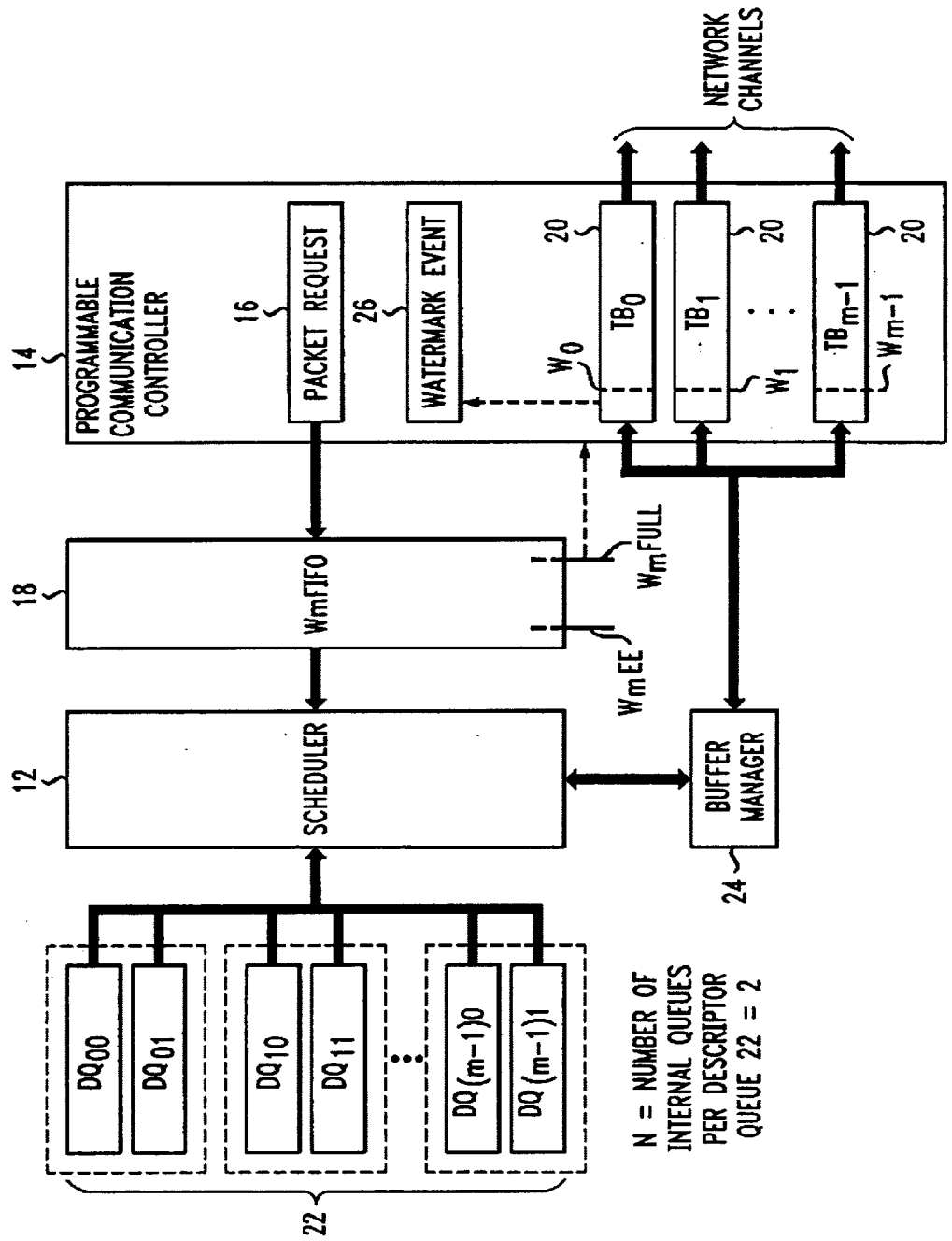
FIG. 1 is schematic block diagram of a packet scheduling arrangement for an information network according to the invention.

FIG. 1 shows an information packet scheduling arrangement 10 according to the invention. In the scheduling arrangement 10, a "closed loop" approach is taken wherein an information packet is delivered to a channel buffer only in response to a request associated with the channel. Specifically, a packet scheduler 12 is configured to respond to watermark event signals which may originate, for example, from a programmable communication controller 14 (e.g., type TS-704 available from T.sqware) which has been configured and programmed to control operations of components of the arrangement 10 and the timing of such operations, as described below. In a typical application, the controller 14 itself may be coupled to a PCI bus (not shown) over which address, control and data signals are transmitted from and delivered to the controller 14. Further, in the arrangement 10, a maximum size (e.g., 3000 bytes) is imposed for system packets, and the capacities of the channel buffers are also limited to accommodate, for example, not more than two or three full-size packets.

A packet request controller 16 which may be part of the controller 14, operates to supply the event signals to an input of a watermark event FIFO 18 (WmFIFO). The packet scheduler 12 is configured to detect and to respond to the event signals (packet requests) in the order the signals are output from the watermark event FIFO 18.

As seen in FIG. 1, the communication controller 14 maintains M transmit buffers 20 ($TB_0$ to $TB_{M-1}$) for the same number of logical channels. For example, each buffer 20 may have a capacity of two full-size system packets (3000 bytes), and preferably not more than three full-size packets. A watermark level is associated with each of the buffers 20, and each of the buffer watermark levels $W_0$ to $W_{M-1}$ is user programmable via the controller 14. The watermark levels are measured in bytes rather than in numbers of packets, and the levels may be adjusted dynamically to achieve sub-optimal performance, if desired.

A number of descriptor queues 22 ($DQ_0$ to $DQ_{M-1}$) are coupled to the packet scheduler 12. Each of the queues 22 is arranged to receive incoming packet descriptors representing information packets to be transmitted over a corresponding channel. Also, in the illustrated embodiment, each of the queues 22 has multiple internal queues, e.g., $DQ_{00}$ and $DQ_{01}$. Incoming descriptors representing higher priority (e.g., real time) information are enqueued in a first internal queue (e.g., $DQ_{i0}$) of each descriptor queue 22, where i=0 to M−1. Descriptors representing lower priority information (e.g., ordinary data) are enqueued in a second internal queue ($DQ_{i1}$) of each queue 22. Each of the queues 22 may also have three or more internal queues, or be in the form of a single queue, depending on the application at hand. Information packets corresponding to dequeued descriptors are loaded for transmission into corresponding buffers 20 by operation of a packet buffer manager 24, which cooperates with the packet scheduler 12.

As mentioned, the maximum packet size is restricted, e.g., to 1500 bytes. The size of each transmit buffer 20 is then chosen to be small relative to the maximum packet size, for example, to a size of only two full packets (or 3000 bytes). As explained below, by limiting the maximum packet size and the capacity of the transmit buffers 20 accordingly, transmission disturbances within a channel that would otherwise be noticed when a small-size packet of real time (high priority) information is buffered behind large-size packets of low priority information, are greatly reduced or avoided.

When a number of bytes (not packets) awaiting transmission in a given transmit buffer 20 runs below the buffer's set watermark value $W_i$, a watermark event signal for the corresponding channel is provided from the packet request controller 16 to the watermark FIFO 18. A flow control procedure, discussed later below, avoids generation of multiple watermark events at any one time for the same logical channel.

Occupancy levels of the transmit buffers 20 are monitored in a round-robin fashion by the packet request controller 16. When the number of bytes in a given transmit buffer 20 falls below the watermark value Wi programmed for the buffer, and a partial almost full (WmFULL) flag of the watermark FIFO 18 is de-asserted, a watermark event signal is directed into the WmFIFO 18 by operation of the packet request controller 16. As shown in FIG. 2, the event signal format may include, e.g., a 13-bit logical channel number (LCN), identifying the transmission channel whose buffer has signaled that the number of bytes remaining for transmission has fallen below the set watermark level. Upper bits of the event word in FIG. 2 may be reserved for other or future use.

The WmFULL signal associated with the FIFO 18, is programmed or set to be triggered at a threshold that will assure that sufficient space will remain in the FIFO 18 to accommodate all possible outstanding watermark event signals associated with the transmit buffers 20, without danger of overflow. The WmFULL signal is detected by the controller 14, and the controller has an associated watermark event signal queue 26 which is, e.g., four words deep. Since there may also be four outstanding event transfers, setting the WmFULL flag to a threshold of at least eight words or more should be sufficient. Further, if a maximum number of outstanding event requests that can be handled by the controller 14 is known (e.g., 512 outstanding requests for the type TS-704), a threshold of at least the same number of words may be chosen for activation of the WmFULL flag.

The scheduler 12 may maintain and monitor an event empty (WmEE) flag associated with the watermark FIFO 18. The scheduler is backpressured (i.e., idle) if WmEE is asserted. If WmEE is not asserted, events are emptied from the FIFO 18 one by one in the order they were entered, to the packet scheduler 12. As mentioned, the event signals output from the FIFO 18 are requests for packets whose descriptors are dequeued from the queues 22. Importantly, when an event signal identifying a given channel is received by the scheduler 12, and the descriptor queue associated with the channel has multiple internal queues, those descriptors contained in a high priority queue (e.g., queue $DQ_{00}$ in FIG. 1) are dequeued ahead of descriptors contained in a low priority queue (e.g., $DQ_{01}$) for the given channel. Information packets corresponding to the dequeued descriptors are then fetched and placed in the transmit buffer 20 for the given channel. Even though the threshold value is set in bytes, the scheduler will transfer in terms of complete packets which can vary individually in size.

When comparing buffer occupancy with the watermark threshold value for a given transmit buffer 20, a coarser granularity of more than one byte for the threshold value may be used. For example, a granularity of 64 bytes may perform satisfactory, while easing the software implementation for the communication controller 14. As mentioned, the watermark threshold value is measured in bytes, rather than packets. This avoids an underrun of the transmit buffers 20 as might occur when a channel is allocated with a high bandwidth, and arriving packets are small in size. In such a case, the transmit buffer for the channel will be drained rapidly, and an insufficient number of requests for additional packets will be generated. Setting the threshold too low will result in an inefficient use of the transmit channel. If the threshold is set too high, the QoS will suffer. In the latter case, it is possible that many low priority packets are already queued, and then a new high priority packet arrives. The high priority packet will then be transmitted only after the lower priority packets, thus adversely affecting the QoS.

Figure 5A:
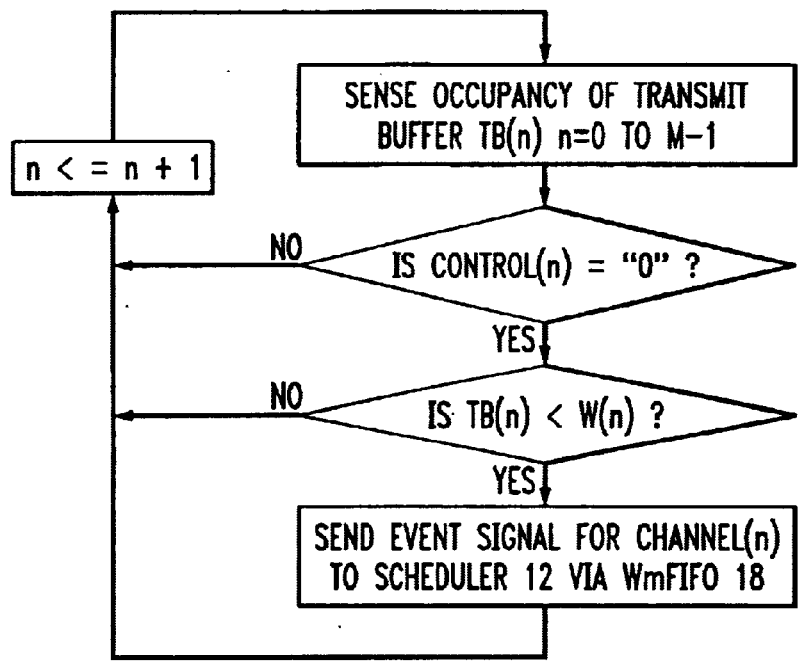
FIGS. 5A and 5B are flow diagrams illustrating a general operation of the packet scheduling arrangement of FIG. 1.
Figure 5B:
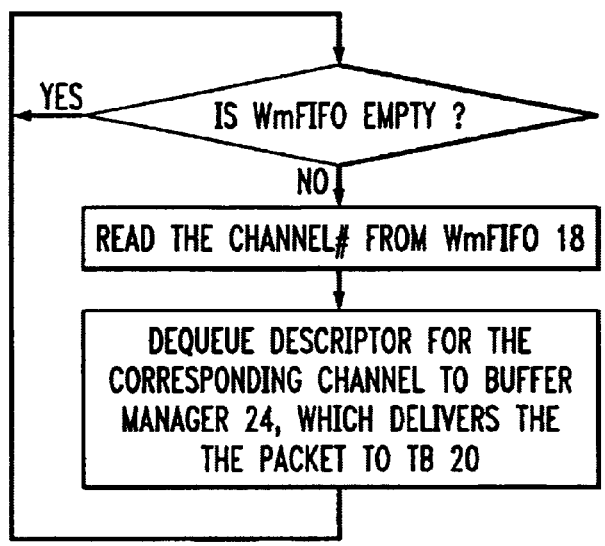

As noted earlier, a flow control is necessary to avoid generating multiple watermark event signals corresponding to the same channel. The following mechanism ensures that a new watermark event is generated only when the previous request has been fulfilled. In other words, there is at most one outstanding watermark event per channel at any time. One control bit may be assigned to each channel to manage the event flow, and the control bits all set to "0" initially. The control bit for each channel is set to "1" when a watermark event is generated. It is then reset to "0" each time a packet is fetched and stored in the corresponding buffer 20. The following is an example of a flow control procedure with pseudo codes, and assuming 256 channels per controller 14. FIGS. 5A and 5B are flow diagrams showing operations of the controller 14 and the scheduler 12.

```
while(TRUE) {
  For i=0 to 255
  {
    if (control[i]='0') then
      if (WmFULL='0') then
        if (number_of_bytes[i]<watermark_leve[i]) then
          generate a watermark event with channel# i;
          control[i]='1';
          i=i+1;
        end if;
      end if;
    else
      i=i+1;
    end if;
  };
}
```

With the above flow control procedure, there can be at most one outstanding request per logical channel. Thus, the size of the watermark FIFO 18 may be small since the FIFO will not contain more than M requests, where M is the number of logical channels supported by the arrangement 10. Accordingly, the controller 14 need not monitor the WmFULL flag of the watermark FIFO 18 since the latter will never overflow.

The backpressure mechanism embodied in the arrangement 10 uses a combination a small and fixed-size transmit buffer 20 for each logical channel, and an adjustable watermark threshold value for each channel buffer. The size of the transmit buffers is chosen not too small as to cause underrun or to overflow easily, and not too large as to minimize the frequency or rate at which a given channel is served with new information packets. As explained further below, quality of service (QoS) is also provided for those channels that support more than one class of service if each transmit buffer 20 is small and of a fixed-size.

To understand the significance of using a small and fixed-size transmit buffer to provide (QoS) among different classes of traffic within a logical channel, assume, for example, that a given channel i supports two classes of service, viz., high priority and low priority traffic. That is, N=2 wherein N is the number of internal queues in the descriptor queue for the channel. See FIG. 1. Assume also that the maximum packet size is fixed, and that high priority packets always preempt low priority packets in the descriptor queues. Thus, when a request associated with channel i is received by the scheduler 12, the scheduler will operate always to look at the high priority queue first if that queue is not empty.

FIG. 3 shows a scenario where the size of a transmit buffer can accommodate six or more full-size packets, and FIG. 4 illustrates a case where the size of a transmit buffer 20 can hold only two full-size packets. FIG. 3 shows that due to the large size of the transmit buffer, a late arrived information packet PKT_H is placed behind five low priority packets PKT_L. Thus, the high priority packet PKT_H suffers a queuing delay equal to the transmission time of five PKT_Ls ahead of the high priority packet. By using a small size transmit buffer, as in FIG. 4, high priority packet PKT_H needs to wait only for the transmission time of one low priority PKT_L, since the packet scheduler 12 cannot deliver more than two information packets to buffer $TB_i$ at one time. A service guarantee for the high priority packets is therefore possible if the size of the transmit buffers 20 is kept sufficiently small.

Restricting the maximum packet size to, e.g., 1500 bytes also helps the delay performance of small-size real time packets (i.e., high priority traffic) which may follow right after a large size data packet (low priority) within the same channel transmit buffer. In a worst case example, in a channel allocated with a bandwidth of 64 Kbps, if a small real time packet is buffered behind a 1500 byte data packet, the former will have a wait time of not more than 187.5 msec in the buffer before transmission.

While the foregoing description represents a preferred embodiment of the invention, it will be obvious go those skilled in the art that various changes and modifications may be made, without departing from the spirit and scope of the invention pointed out by the following claims.

We claim:

1. A method of transmitting streams of packetized information selectively over channels of an information network, comprising:

associating a number of queues with corresponding transmission channels of the network, enqueuing incoming descriptors representing information to be transmitted over a given channel in a queue associated with the given channel, and dequeuing the descriptors from the queues by operation of a scheduler;

associating a number of transmit buffers with the channels;

defining for each of the transmit buffers a watermark threshold value corresponding to a desired minimum occupancy for the buffer, sensing when the occupancy of a given transmit buffer falls below the threshold value defined for the given buffer, and producing a corresponding watermark event signal identifying the channel associated with the given buffer;

providing the watermark event signals to the scheduler, and delivering information represented by descriptors dequeued by the scheduler to corresponding transmit buffers according to the order of the watermark event signals provided to the scheduler; and setting a capacity for each transmit buffer to correspond to two maximum byte sized packets.

2. The method of claim 1, including setting the watermark threshold value for a given transmit buffer at a certain number of bytes.

3. A method of transmitting streams of packetized information over corresponding channels of an information network, comprising:

associating two or more queues with each of a number of corresponding transmission channels of the network, enqueuing incoming descriptors representing first packetized information be transmitted over a given channel in a first queue associated with the given channel, and dequeuing incoming descriptors representing second packetized information to be transmitted over the given channel in a second queue associated with the channel wherein the second information has a transmission priority less than that of the first information;

dequeuing the descriptors in said queues by operation of a scheduler;

associating a number of transmit buffers with the transmission channels;

defining for each of the transmit buffers a watermark threshold value corresponding to a desired minimum occupancy for the buffer, sensing when the occupancy of a given transmit buffer falls below the threshold value defined for the buffer, and producing a corresponding watermark event signal identifying the channel associated with the buffer;

providing the watermark event signals to the scheduler, loading information represented by descriptors dequeued by the scheduler into corresponding transmit buffers according to the order of watermark event signals provided to the scheduler, and, for a given channel, loading the first information represented by descriptors enqueued in the first queue associated with the channel in a corresponding buffer ahead of the second information represented by descriptors enqueued in the second queue associated with the channel; and setting a capacity for each transmit buffer to correspond to two maximum byte sized packets.

4. The method of claim 3, including setting the watermark threshold value for a given transmit buffer at a certain number of bytes.

5. An arrangement for transmitting packets of information over corresponding transmission channels of an information network, comprising:

a controller configured to control operations of components of the system and the timing of said operations;

a number of queues associated with the transmission channels of the network;

said queues are constructed and arranged to enqueue incoming descriptors representing information to be transmitted over a given channel in a queue associated with the given channel;

a number of transmit buffers associated with the transmit channels;

the controller is configured to define for each of the transmit buffers a watermark threshold value corresponding to a desired minimum occupancy for the buffer, to sense when the occupancy of the given buffer falls below the threshold value defined for the buffer, and to produce a corresponding watermark event signal identifying the channel associated with the given buffer; and a scheduler coupled to said controller and responsive to the watermark event signals, wherein said scheduler is configured to dequeue the descriptors from the queues associated with the transmission channels, and to deliver information packets represented by the descriptors to corresponding transmit buffers according to the order of the watermark event signals produced by the controller, said information packets have a set maximum packet size, and the transmit buffers have capacities corresponding to two maximum byte sized packets.

6. The arrangement of claim 5, wherein the controller is arranged to set the watermark threshold value for each transmit buffer at a certain number of bytes.

* * * * *